(12) United States Patent
Usui

(10) Patent No.: US 10,633,525 B2
(45) Date of Patent: Apr. 28, 2020

(54) MELT-MOLDING MATERIAL USING EVOH RESIN

(71) Applicant: THE NIPPON SYNTHETIC CHEMICAL INDUSTRY CO., LTD., Osaka (JP)

(72) Inventor: Shintaro Usui, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/135,717

(22) Filed: Apr. 22, 2016

(65) Prior Publication Data

US 2016/0237267 A1 Aug. 18, 2016

Related U.S. Application Data

(63) Continuation of application No. PCT/JP2014/082880, filed on Dec. 11, 2014.

(30) Foreign Application Priority Data

Dec. 13, 2013 (JP) .................................. 2013-258056

(51) Int. Cl.
*C08L 23/08* (2006.01)
*C08K 5/20* (2006.01)
*B29B 9/12* (2006.01)

(52) U.S. Cl.
CPC ............ *C08L 23/0861* (2013.01); *B29B 9/12* (2013.01); *C08K 5/20* (2013.01); *C08L 23/0853* (2013.01); *C08L 2205/025* (2013.01)

(58) Field of Classification Search
CPC ............................. C08L 23/0861; C08L 23/08
USPC ....................................................... 524/524
See application file for complete search history.

(56) References Cited

U.S. PATENT DOCUMENTS

| 2013/0065001 A1* | 3/2013 | Kani | .................... C08K 5/098 |
| | | | 428/35.7 |
| 2013/0225756 A1* | 8/2013 | Igarashi | ................. C08L 23/12 |
| | | | 524/524 |

FOREIGN PATENT DOCUMENTS

| EP | 2 554 590 A1 | 2/2013 |
| JP | S63-230757 A | 9/1988 |
| JP | 08-239528 | * 9/1996 |
| JP | H08-239528 A | 9/1996 |
| JP | 2000-128996 A | 5/2000 |
| JP | 2000-264972 A | 9/2000 |

OTHER PUBLICATIONS

European Search Report issued with respect to application No. 14870125.3, dated Mar. 27, 2017.
International Search Report issued with respect to application No. PCT/JP2014/082880, dated Mar. 10, 2015.
International Preliminary Report on Patentability issued with respect to application No. PCT/JP2014/082880, dated Jun. 14, 2016.

* cited by examiner

*Primary Examiner* — Deve V Hall
(74) *Attorney, Agent, or Firm* — Greenblum & Bernstein, P.L.C.

(57) ABSTRACT

As a molding material comprising two or more EVOH resins differing in their ethylene unit content, disclosed is a pellet mixture of two or more types of EVOH resin pellets differing in their ethylene unit content. The pellet mixture has excellent feed property and film moldability with reduced surge in melt extrusion molding. Disclosed is a molding material comprising the pellet mixture and lubricant, in which more than 75% by weight of the lubricant is carried on their surface of low ethylene EVOH resin pellets having lowest ethylene unit content.

8 Claims, No Drawings

MELT-MOLDING MATERIAL USING EVOH RESIN

CLAIM FOR PRIORITY

This application is a Continuation of PCT/JP2014/082880 filed Dec. 11, 2014, and claims the priority benefit of Japanese application 2013-258056 filed Dec. 13, 2013, the contents of which are expressly incorporated by reference herein in their entireties.

TECHNICAL FIELD

The present invention relates to a melt-molding material comprising two or more saponified ethylene-vinyl ester-based copolymers (hereinafter, referred to as "EVOH resin(s)") differing in ethylene unit content, in particular, an EVOH resin melt-molding material exhibiting excellent feed property and film moldability in melt extrusion molding.

BACKGROUND ART

EVOH resin has a high crystallinity due to firmly hydrogen bonding between hydroxyl groups in the polymer chain thereof, therefore exhibiting strong intermolecular force. Not only crystal part but also amorphous part in EVOH resin can exhibit strong intermolecular force. This provides EVOH resin film with excellent gas-barrier property.

EVOH resin is utilized for packaging film or sheet, or container such as bottle for food, pharmaceutical, industrial medicine, agricultural chemicals, and so on, because of the excellent gas-barrier property.

On the other hand, EVOH resin is brittle and lacks flexibility, which is defect of EVOH resin. In the case that a packaging or molded article as a final product of EVOH resin is subjected to repeated folding, the defect is liable to crack or generate pinhole due to flex fatigue and makes difficult to retain the excellent gas barrier property of EVOH resin.

In order to solve these problems, for example, JP S63-230757A (Patent document 1) suggests a resin composition employing a combination of two EVOH resins differing in content of ethylene unit (hereinafter, "ethylene unit content") and satisfying a specific relation in solubility parameters of these EVOH resins.

It is generally known that the lower ethylene unit content the EVOH resin has, the more excellent gas-barrier the EVOH resin exhibits. Also it is known that the higher ethylene unit content the EVOH resin has, the more increased strength the molded article by hot-drawing has. These make possible to keep gas-barrier property at the same time hot-drawing moldability secures by combining an EVOH resin having a relatively high ethylene unit content together with an EVOH resin having a relatively low ethylene unit content.

By the way, a film of EVOH resin and a multilayer structure including an EVOH resin film. (EVOH resin layer) are commonly produced by feeding pellets of EVOH resin to an extruder and melt-molding into film or sheet. Thus produced film or sheet of EVOH resin and a multilayer structure including EVOH resin film or sheet are formed to a container by fabrication with a mold such as deep drawing or air-pressure forming.

The patent document 1 discloses that pellets produces by pelletizing after dry-blending two types of EVOH resins with extruder or the like are used as a molding material.

According to the patent document 1, if EVOH resins are unevenly dry-blended in the pellet production, thus produced pellets are likely to provide a nonuniform EVOH resin layer or EVOH resin layer with torn.

Precision of shape or thickness of a molded product varies depending on properties of EVOH resin pellets used as a molding material. For this reason, a molded product sometimes does not exhibit properties expected from intrinsic properties of EVOH resin used as a molded material.

Pellets capable of obtaining a molded article with desired properties based on intrinsic properties of EVOH resin are suggested in, for examples JP2000-264972A (Patent document 2). The patent document 2 discloses that if angle of repose of EVOH resin pellets is adjusted to the range between 30 and 45° by addition of 10 to 1000 ppm of lubricant to EVOH resin, the EVOH resin pellets exhibit excellent feed property to an extruder in melt-extrusion molding as well as reduced variation in torque and discharge of the extruder in molding. As a result, a molded article having precision of shape and dimension such as thickness may be obtained.

PRIOR ART

Patent Document

[Patent document 1] JP S63-230757A
[Patent document 2] JP2000-264972A

SUMMARY OF THE INVENTION

Technical Problem to be Solved by the Invention

As a molding material comprising a plurality of EVOH resins, two kinds of pellets may be used. One is EVOH resin mixture pellets obtained by kneading a plurality of EVOH resins to prepare homogenous EVOH resin mixture and pelletizing the EVOH resin mixture (e.g. patent document 1), the other is EVOH resin pellet mixture obtained by dry-blending plural types of EVOH resin pellets.

In either the pellet of EVOH resin mixture or EVOH resin pellet mixture, they are melt-kneaded with extruder or a like apparatus to form into film or sheet as a molding material. Since the pellet mixture disregards a pelletizing process of EVOH resin mixture, a molding material comprising pellet mixture is easily prepared by combining various types of EVOH resin pellets. Accordingly, such pellet mixture is an advantageous molding material comparing with pellet of resin mixture because the former can apply to a variety of molding materials, resulting in reducing the production cost.

In the case of pellet mixture which is a mixture of plural types of EVOH resin pellets differing in their EVOH resin, sequential processes of melt-kneading and molding need to be continuously conducted. In order to produce a molded product made form homogenously resin mixture derived from the pellet mixture, precisely controlled melt-extruding with screw is needed, which requires high level technique.

The procedure suggested in the patent document 2 aims to obtain a molded article excellent in precision of shape and dimension such as thickness, however, the procedure applies to the production using pellets made of only one EVOH resin. The patent document 2 neither disclose nor teach whether or not a similar effect is obtained in the case of molding pellet mixture of plural types of EVOH resin pellets differing in EVOH resin thereof.

Under these situations, the object of the present invention is to provide, as a molding material of mixture of two or more EVOH resins, a melt-molding material employing EVOH resin pellet mixture which is a mixture of plural types of EVOH resin pellets differing in ethylene unit content of the EVOH resin. The intended pellet mixture exhibits excellent film productivity without surging and excellent feed property in melt-extrusion molding even though the pellet mixture is used directly for melt-molding.

Means for Solving the Problems

The present inventor has studied hard about pellet mixtures for providing a molding material satisfying the following properties:
Excellent feed property, which can reduce load given to the screw when melting pellets at the melt or plasticating section in the extrusion in the case of melt molding using pellet mixture; and Excellent film moldability, which corresponds to reduction of the difference between maximum value and minimum value in width of extrusion molded film, that is to say, reduced surge.

First, the inventor tried to add lubricant to a molding material for the purpose of making it easier to mix different types of EVOH resin pellets, and found that some resulting molding materials did not exhibit the same feed properties and film moldabilities each other even when the same amount of lubricant is added. The inventor further studied about distribution of the lubricant in the mixture of EVOH resin pellets, and completed the invention.

A melt-molding material of the invention comprises a lubricant and a mixture of two or more types of saponified ethylene-vinyl ester copolymer (EVOH resin) pellets, the types of pellets differing in their ethylene unit content. The type of EVOH resin pellets (A1) which has the lowest ethylene unit content in the mixture (hereinafter called "low ethylene EVOH resin pellets (A1)") contains more than 75% by weight of the lubricant,
Preferably the lubricant contained in the low ethylene EVOH resin pellets (A1) includes lubricant which is carried on the surface of the pellets (A1). Also, the total weight of the lubricant is preferably from 50 to 250 ppm based on the total weight of EVOH resins.

The content of the low ethylene EVOH resin pellets (A1) is preferably in the range of 50 to 90% by weight based on the total weight of EVOH resin pellets. According to the invention, a preferable mixture comprises the type of low ethylene EVOH resin pellets (A1) which has 30 mol % or less of ethylene unit content, and the type of EVOH resin pellets which has an ethylene unit content more than 30 mol % (hereinafter "high ethylene EVOH resin pellets").

A difference in ethylene unit content between the low ethylene EVOH resin pellets (A1) and the type of EVOH resin pellets (A2) which has the highest ethylene unit content in the mixture is preferably 5 mol % or more.

A manufacturing method of the invention is a method for manufacturing a molding material comprising a lubricant and a mixture of two or more EVOH resins differing in their ethylene unit content. The method comprises a process of dry-blending more than 75% by weight of the lubricant with the type of EVOH resin pellets having the lowest ethylene unit content, i.e. low ethylene EVOH resin pellets.

The method preferably further comprises a process of dry-blending another type of EVOH resin pellets with the low ethylene EVOH resin pellets. The lubricant is carried on the surface of the low ethylene EVOH resin pellets by the aforementioned dry-blending process.

Effect of the Invention

The molding material of the invention is versatile and exhibits excellent feed property and film moldability when melt-extrusion molded.

MODES FOR CARRYING OUT THE INVENTION

The present invention will be described in detail below. The following is merely description for a typical embodiment and does not restrict the invention.
<Melt-molding Material>
A melt-molding material comprises a lubricant and a mixture of two or more types of EVOH resin pellets, the types of pellets differing in their ethylene unit content. The type of EVOH resin pellets (A1) having the lowest ethylene unit content in the mixture (hereinafter called "low ethylene EVOH resin pellets (A1)") contains more than 75% by weight of the lubricant.

Components constituting the molding material of the present invention will be described below.
(1) EVOH Resin
EVOH resin used in the invention is a resin commonly obtained by copolymerizing ethylene and vinyl ester-based monomer and thereafter saponifying the resulting copolymer. Such EVOH resin is water-insoluble thermoplastic resin. A typical vinyl ester-based monomer is vinyl acetate from the economic view. Any known polymerization method, for example solution polymerization, suspension polymerization, or emulsion polymerization may be employed for the copolymerization. A solution polymerization using methanol as a solvent and a known saponification of the ethylene-vinyl ester copolymer are employed for a typical production method for EVOH resin.

The EVOH resin thus produced contains ethylene unit and vinyl alcohol structural unit as main constituting units and further contains a bit of vinyl ester structural unit as left unsaponified unit.

The EVOH resin used in the invention may further contain a unit derived from the following comonomer. Examples of the comonomer include α-olefins such as propylene, isobutene, α-octene, α-dodecene, and α-octadecen; hydroxyl group-containing α-olefins such as 3-buten-1-ol, 4-penten-1-ol and 3-buten-1,2-diol; hydroxyl group-containing α-olefin derivatives such as esterified or acylated product of the hydroxyl group-containing α-olefin; unsaturated carboxylic acid, salt thereof, or partially alkyl ester, completely alkyl ester, nitrile, amide, anhydride, unsaturated sulfonic acid or salt thereof, vinylsilane compound, vinyl chloride, styrene, or a like comonomer.

Furthermore, a post-modified EVOH resin such as urethanated, acetalizated, cyanoethylated, or oxyalkylenated EVOH resin may also be used.

In such modified EVOH resin, an EVOH resin having a primary hydroxyl group at a side chain introduced by copolymerization is preferred from the viewpoint of improved formability in post-molding process such as stretching process, vacuum- or air-pressure forming. Particularly preferable modified-EVOH resin is EVOH resin in which 1,2-diol structural unit is introduced at the side chain thereof.

An EVOH resin suitable in the invention has an ethylene unit content of usually 20 to 60 mol %, preferably 25 to 50 mol %, particularly preferably 27 to 48 mol %. The ethylene unit content is unduly low, the resulting molded product, especially stretched film, would exhibit a lowered gas-barrier property under high humidity. If the ethylene unit content is unduly high, the stretched film would exhibit lowered gas-barrier property.

The ethylene unit content may be determined according to ISO14663.

An EVOH resin suitable in the invention has a saponification degree of the vinyl ester unit of the EVOH resin ranging usually from 90 mol % or more, preferably from 93 to 99.99 mol %, particularly preferably from 98 to 99.99 mol %. If the saponification degree is unduly low, the resulting stretched film would be lowered in gas-barrier property and humidity resistance.

The saponification degree of the vinyl ester structural unit is determined according to, for example, JIS K6726 with the proviso that EVOH resin is dissolved homogeneously in water/methanol solvent.

Melt flow rate (MFR.) of the EVOH resin at 210° C. under a load of 2160 g is usually from 1 to 100 g/10 minutes, preferably from 2 to 50 g/10 minutes, particularly preferably from 3 to 30 g/10 minutes. If the EVOH resin has unduly high MFR, mechanical strength of the molded product therefrom tends to be lowered. If the EVOH resin has unduly low MFR, extrusion processability in molding tends to be lowered.

The EVOH resin of the invention may contain an additive optionally added to EVOH resin, for example, heat stabilizer, antioxidant, antistatic agent, colorant, ultraviolet absorber, plasticizer, light stabilizer, surfactant, insecticide, drying agent, anti-blocking agent, fire retardant, crosslinking agent, curing agent, foaming agent, crystal forming agent, anti-fogging agent, biodegradable agent, silane coupling agent, or oxygen scavenger, within the range not inhibiting the effect of the invention.

The heat stabilizer is used for the purpose of improving various physical properties including thermal stability in melt-molding. Examples of the heat stabilizer include organic acids such as acetic acid, propionic acid, butyric acid, lauric acid, stearic acid, oleic acid, and behenic acid or alkaline metal (e.g. sodium and potassium) salt, alkaline earth metal (e.g. calcium and magnesium), or zinc salt thereof; or inorganic acids such as sulfuric acid, sulfurous acid, carbonic acid, phosphoric acid, and boric acid acids, or alkaline metal (e.g. sodium and potassium) salt, alkaline earth metal (e.g. calcium and magnesium), or zinc salt thereof.

Of these, acetic acid, boron compound such as boric acid or salt thereof, acetate or phosphate is particularly preferably used.

In the case of adding acetic acid, the amount is usually from 0.001 to 1 parts by weight, preferably 0.005 to 0.2 parts by weight, particularly preferably 0.010 to 0.1 parts by weight, based on 100 parts of EVOH resin. If the amount of acetic acid is unduly low, sufficient effect of acetic acid would not be obtained. On the contrary, if the amount of acetic acid is unduly high, the production of film having uniformity would be difficult.

In the case of adding boron compound, the amount is usually from 0.001 to 1 parts by weight, preferably 0.002 to 0.2 parts by weight, particularly preferably 0.005 to 0.1 parts by weight, in terms of boron, based on 100 parts by weight of EVOH resin. The weight of boron is determined by ICP emission analysis after incineration of the boron compound. If the amount of the boron compound is unduly low, sufficient effect of boron compound would not be obtained. On the contrary, if the amount of the boron compound is unduly high, the production of film having uniformity would be difficult.

The amount of metal salt of acetic acid, phosphate or hydrogen phosphate is usually from 0.0005 to 0.1 parts by weight, preferably from 0.001 to 0.05 parts by weight, particularly preferably from 0.002 to 0.03 parts by weight, in terms of weight of metal based on 100 parts by weight of EVOH resin. The weight of metal is determined by ICP emission analysis after incineration of the metal salt. If the amount of the metal salt is unduly low, sufficient effect of the metal salt would not be obtained. On the contrary, if the amount of the metal salt is unduly high, the production of film having uniformity would be difficult. In the case of adding two or more of salts to EVOH resin, the total amount of the metal salts is desired to fall in the above range.

(2) Lubricant

A lubricant known as a common lubricant for EVOH resin may be used. Examples of the lubricant include higher fatty acid (e.g. lauric acid, myristic acid, pahnitic acid, stearic acid, behenic acid, oleic acid, etc.), higher fatty acid metal salt (aluminum salt, calcium salt, zinc salt, magnesium salt, or barium salt of the above-mentioned higher fatty acid), higher fatty acid ester (methyl ester, isopropyl ester, butyl ester, or octyl ester of the above-mentioned higher fatty acid), higher fatty acid amide (saturated aliphatic amide such as stearamide and behenic acid amide, unsaturated fatty acid amide such as oleic amide and enicic amide, bis-fatty acid amide such as ethylene his stearic acid amide, ethylene his oleic amide, ethylene his erucic amide, and ethylene bis lauric amide), low molecular weight polyolefins such as low molecular weight polyethylene and low molecular weight polypropylene each having a molecular weight of 500 to 10,000 or acid modified thereof, higher alcohol, ester oligomer, fluorized ethylene resin, and so on. Among them, higher fatty acid and/or a metal salt thereof, ester, or amide is preferred, and higher fatty acid metal salt and/or higher fatty acid amide is more preferred. Of these, higher fatty acid amide is preferably used from the viewpoint of stable extrusion process.

As the lubricant, solid (powder, fine powder, flake and so on), semi-solid, liquid, paste, solution, emulsion (aqueous dispersion), and any other forms of lubricant may be used. In order to effectively produce an intended molding material of the invention, powder type lubricant is preferably used. In the case of powder type lubricant, the particle diameter is selected from the range of usually 0.1 to 100 μm, preferably 1 to 75 μm, particularly preferably 5 to 50 μm.

The amount of lubricant is selected from the range of usually 50 to 250 ppm, preferably 100 to 200 ppm, particularly preferably 120 to 180 ppm, based on the total weight of EVOH resins contained in the molding material. The amount of the lubricant is unduly low, different types of EVOH resins is hard to incorporate from each other. This causes uneven plasticating level in melt/plasticating section in extruder, resulting in noise emission due to friction between screw and pellets. This makes feed property impaired. On the other hand, if the amount of lubricant is unduly high, defects such as fish eye would occur in the obtained film.

(3) Other Additives

Besides the aforementioned ingredients, a molding material of the invention may contain plasticizer, filler, anti-blocking agent, antioxidant, colorant, antistatic agent, ultraviolet absorber and the like known additive, in an amount of the range without adversely affecting, for example, 1 wt % or less. Such additive is usually added to EVOH resin, and therefore is contained in each of EVOH resin pellets.

<Pellet Mixture>

A pellet mixture of EVOH resins as a component of the molding material of the invention is a mixture of two or more types of EVOH resin pellets, the types of pellets differing in their ethylene unit content.

A preferable pellet mixture comprises one type of EVOH resin pellets having ethylene unit content of 30 mol % or less (hereinafter called as "low ethylene EVOH resin pellet(s)"), and the other type of EVOH resin pellets having an ethylene unit content more than 30 mol % (hereinafter called as "high ethylene EVOH resin pellet(s)").

The low ethylene EVOH resin pellet, which has an ethylene unit content of 30 mol % or less, has excellent gas-barrier property. The high ethylene EVOH resin pellet, which has an ethylene unit content more than 30 mol %, exhibits impaired gas-barrier property but has excellent hot-drawing moldability. Accordingly, a mixture of these types of pellets could provide a film or sheet exhibiting gas-barrier property simultaneously with excellent heat-drawing property.

A preferable low ethylene EVOH resin pellet has an ethylene unit content lower than high ethylene EVOH resin pellet by 5 mol % or more. The difference in the ethylene unit content between low ethylene EVOH resin pellet and high ethylene EVOH resin pellet is in the range of preferably 5 to 30 mol %, more preferably 10 to 26 mol %, particularly preferably 10 to 23 mol %. If the difference in ethylene unit content is unduly small, formability in post-molding or gas-barrier property would be impaired. If the difference in ethylene unit content is unduly large, compatibility of EVOH resins would be lowered and extrusion processability would be lowered.

The EVOH resin pellet mixture used in the invention is not only a pellet mixture of two types of EVOH resin pellets consisting of one type of low ethylene EVOH resin pellets and the other type of high ethylene EVOH resin pellets, but also a pellet mixture of three or more types of EVOH resin pellets.

Examples of a mixture of 3 or more types of EVOH resin pellets include a mixture of 2 or more types of low ethylene EVOH resin pellets each type differing in ethylene unit content, and one type of high ethylene EVOH resin pellets; a mixture of one type of low ethylene EVOH resin pellets, and two or more types of high ethylene EVOH resin pellets; and a mixture of two or more types of low ethylene EVOH resin pellets and two or more types of high ethylene EVOH resin pellets. A preferable mixture is a mixture consisting of one type of low ethylene EVOH resin pellets and one type of high ethylene EVOH resin pellets from the viewpoint of controllability.

In the case of a mixture of 3 or more types EVOH resin pellets, low ethylene EVOH resin pellets having the lowest ethylene unit content and high ethylene EVOH resin pellets having the highest ethylene unit content are selected such that the difference in the ethylene unit content between them falls within the above range.

In the case of a mixture of 2 types of EVOH resin pellets, a mixing ratio (A1/A2) in weight of low ethylene EVOH resin pellet (A1) to high ethylene EVOH resin pellet (A2) is in the range of usually 50/50 to 90/10, preferably 60/40 to 90/10, more preferably 65/35 to 85/15, particularly preferably 70/30 to 80/20. If the rate of low ethylene EVOH resin (A1) is unduly small, the resulting molding material would be impaired in gas-barrier property. If the rate of low ethylene EVOH resin (A1) is unduly high, the formability in post-molding of resulting molding material would be impaired. Consequently, the percentage of low ethylene EVOH resin pellet (A1) is preferably selected from the range of 50 to 90 wt %, preferably 60 to 90 wt % based on the total weight of EVOH resin pellets.

EVOH resin pellets may be produced by, for example, a method of obtaining a strand by extruding EVOH resin solution to a coagulating bath through die plate or by cooling and hardening the extrudate of EVOH resin melt (i.e. molten EVOH resin liquid), followed by cutting the strand with a strand cutter at every given length; a method of extruding molten water-containing EVOH resin solution to a coagulating bath through emission outlet and cutting extrudate containing still molten EVOH resin at every given length, thereby obtaining EVOH resin pellets each having sphere-like shape due to its surface tension in coagulating bath.

A pellet of EVOH resin containing an additive may be produced by using EVOH resin solution or EVOH resin melt respectively containing an additive.

Thus produced low ethylene EVOH resin pellets and high ethylene EVOH resin pellets are mixed in a given ratio to produce EVOH resin pellet mixture of the invention.

The molding material of the invention is characterized that more than 75% by weight of the lubricant is contained in the low ethylene EVOH resin pellets. In other words, the lubricant is not present in evenly distributed manner in the pellet mixture, but contained in preferentially low ethylene EVOH resin pellets.

In the case of a mixture of three types or more of EVOH resin pellets, more than 75% by weight of the lubricant is contained preferentially in the type of EVOH resin pellets having the lowest ethylene content.

The percentage of the lubricant contained in low ethylene EVOH resin pellet is more than 75%, usually from 76% or more to 100% or less, preferably from 79% or more to 99% or less, particularly preferably from 83% or more to 97% or less, by weight based on the total lubricant in molding material. If the percentage of the lubricant contained in low ethylene EVOH resin pellets is unduly low, surge would occur in extrusion molding and therefore the film produced by extrusion molding varies in width with no relation to the amount of lubricant. This means the molding material is inferior in film moldability. On the other hand, if the percentage of the lubricant contained in low ethylene EVOH resin pellets is unduly high, the percentage of high ethylene EVOH resin pellets without lubricant is relatively increased, so an extra load would be added to screw for melting the high ethylene EVOH resin pellets without lubricant. As a result, feed property is impaired so that loud noise occurs in feeding the molding material. Loud noise is caused from melt extrusion molding under an extra load on screw, which accelerates abrasion of the screw. Abrasion powder generated from screw wearing might get mixed in the molded product, resulting in lowering quality of the final molded product.

The low ethylene EVOH resin pellets which contains lubricant in more than 75% by weight of the lubricant may be obtained by dry-blending or melt-kneading, preferably dry-blending the low ethylene EVOH resin pellets produced by aforementioned method with a given amount of lubricant. Lubricant is carried on the surface of low ethylene EVOH resin pellet by dry-blending, and would act effectively.

Dry-blending is performed by mechanically mixing ingredients in the state of particles or pellets. Mixing process is performed with a mixer such as tumbling mixer, ribbon mixer or Henschel mixer. Alternatively, pellets and lubricant may be mixed in a closed container by stirring manually, shaking or the like. Mixing process is performed at a temperature of from room temperature to less than the melting point of EVOH resin pellet in the ambient atmosphere or in nitrogen.

A process of allowing residual lubricant to be contained in high ethylene EVOH resin pellets, or other types of EVOH resin pellets except low ethylene EVOH resin pellets having lowest ethylene unit content (called as "other EVOH resin pellets") in the case that a molding material comprises 3 or more types of EVOH resin pellets, is conducted in the same manner that lubricant is allowed to be contained in low ethylene EVOH resin pellets. Allowing residual lubricant to be contained in an intended high ethylene EVOH resin may be achieved by dry-blending the residual lubricant with an intended high ethylene EVOH resin pellets in advance, or adding the residual lubricant when mixing high ethylene EVOH resin pellets and low ethylene EVOH resin pellets having lubricant carried on their surface. In the case that 3 or more types of EVOH resin pellets are contained in the molding material, other EVOH resin pellets were used instead of the high ethylene EVOH resin pellets in mixing process mentioned above.

The residual lubricant is not limited to be contained in the high ethylene EVOH resin pellets and other EVOH resin pellets, but the residual lubricant may be present independently of EVOH resin pellets in molding material.

In conclusion, a molding material of the invention may be produced as follows: (i) a method of dry-blending low ethylene EVOH resin pellets which contains lubricant with high ethylene EVOH resin pellets including other EVOH resin pellets, and thereafter dry-blending them with residual lubricant; (ii) dry-blending high ethylene EVOH resin pellet which contains lubricant and low ethylene EVOH resin pellet which contains lubricant, both types of pellets independently prepared in advance.

A molding material of the invention is a pellet mixture of plural types of EVOH resin pellets wherein the types of the EVOH resin pellets differ in their ethylene unit content and exist individually. As mentioned above, however, the molding material exhibits excellent miscibility and compatibility in melt extrusion, resulting in excellent feed property. Thus the molding material can become a resin mixture in which a plurality of EVOH resins are incorporated during melt-extruded with screw, and thereby reducing defects such that film width varies when melt-extruding film or sheet and the resulting film is torn. Accordingly, the molding material has excellent moldability.

Thus the molding material as the pellet mixture can provide a melt-molded article having quality as high as a molding material produced from pellets of EVOH resin mixture prepared in advance. A pellet mixture, which is obtained by mixing plural types of pellets, is more easily prepared than pellets of resin mixtures prepared by melt-kneading a plurality of resins. Accordingly, the pellet mixture have broad utility because various molding materials can be prepared by combining various types of EVOH resin pellets differing in their ethylene unit content.

<Molding>

The molding material of the invention is preferably utilized as one for melt-molding, in particular, is formed to film or sheet by melt extrusion molding. Extrusion molding process such as T-die extrusion, tubular film extrusion, blow molding, melt spinning, and contour extrusion, and injection molding process are commonly employed for the melt-molding process.

Types and set conditions of the molding machine are not particularly limited, and both of screw type and plunger type may be employed for melt-plasticized section. However, from the viewpoint that different types of pellets should be mixed uniformly while melt-kneading and extruding, a molding machine with screw type melt-plasticized section is preferably used. Vertical- or horizontal-extruder may be used, and single or twin screw type extruder may be used. As for the screw, L/D (length/diameter) as well as compression ratio (C) are not restricted, but L/D is selected from the range of usually 20 to 35, preferably 25 to 30, and the compression ratio C is selected from the range of usually 1.5 to 8, preferably 2 to 5.

Melt-molding temperature is usually set within the range of 150 to 300° C.

Film or sheet may be formed to cup, bottle or the like. Film or sheet as a molded product of EVOH resin may be utilized to various applications. The film or sheet is commonly laminated over a substrate to form a multilayered film or sheet for the purpose of improving mechanical strength or imparting another function.

A thermoplastic resin is preferably used for the substrate because it can be molded with EVOH resin by melt coextrusion. Examples of the substrate include polyolefins such as polyethylenes including linear low density polyethylene, low density polyethylene, very low density polyethylene, medium density polyethylene, and high density polyethylene, polypropylene, ethylene-propylene block- or random-copolymer, copolymer of propylene and α-olefin having from 4 to 20 carbon atoms, polybutene, and polypentene; graft modified polyolefins in which the aforementioned polyolefin is graft modified with unsaturated carboxylic acid or its ester, ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester elastomer, polyurethane elastomer, halogenated polyolefin such as chlorinated polyethylene and chlorinated polypropylene, aromatic or aliphatic polyketone, and poly alcohols obtained by reducing these polymers. From the viewpoint of practical utility including physical property such as strength of the resulting multilayered structure, polyolefin-based resin and polyamide-based resin are preferably used, and polyethylene and polypropylene are particularly used.

These substrate resin may contain a conventionally known additive such as antioxidant, antistatic agent, lubricant, nucleating agent, anti-blocking agent, ultraviolet absorber, and wax within the range not inhibiting the effect of the invention.

A multilayered sheet or film comprising a layer of the molding material of EVOH resins (i.e. EVOH resins material) of the invention and substrate resin layer may be produced by a known lamination process. Examples of the lamination processes include extruding a substrate resin melt on the film or sheet of EVOH resins material; extruding molten EVOH resins material on film or sheet of substrate resin; coextruding EVOH resins material and substrate resin; a process of assembling EVOH resins material (layer) and substrate resin (layer) using a known adhesive such as organic titanium compound, isocyanate compound, polyester-based compound, or polyurethane compound; coating a solution of EVOH resins material on a film or sheet of substrate resin, and then removing the solvent of the solution.

Of these processes, coextrusion is preferably employed from the viewpoint of cost and environment. Since the molding material has excellent film moldability and reduces the variation in film width during melt-extruding, the molding material is suitable for a material for multilayered structure produced by melt coextrusion with other thermoplastic resin.

Arbitrary structure of the multilayered sheet or film may be employed. Not only double layers structure of a/b but also various structures such as b/a/b, a/b/a, a1/a2/b, a/b1/b2, b2/b1/a/b1/b2, b2/b1/a/b1/a/b1/b2 and other structure may be employed, wherein the layer of EVOH resin mixture is denoted by "a" (for example, a1, a2, . . . ) and the layer of substrate resin is denoted by "b" (for example, b1, b2, . . . ). A recycled material, which is obtained by re-melt molding waste edges and scraps generated in the production of a multilayered structure, comprises EVOH resin mixture and a substrate resin, and therefore may be utilized to form a multilayered sheet or film such as b/R/a, b/R/a/b, b/R/a/R/b, b/a/R/a/b, and b/R/a/R/a/R/b, wherein "R" denotes a layer of the recycled material.

In the multilayered sheet or film mentioned above, an adhesive resin layer may be interposed between the layers, if necessary. A conventional adhesive resin may be used for the adhesive resin layer. An appropriate adhesive resin is selected depending on the type of the substrate resin b. Typically, carboxyl group-modified olefin-based polymer, which is obtained by allowing to chemically bond unsaturated carboxylic acid or anhydride thereof to polyolefin-based resin through addition reaction or grafting reaction, may be employed. In particular, maleic anhydride-modified polyolefin may be preferably used for the adhesive resin for obviously obtaining the effect of the invention.

In the case that a substrate resin is extrusion coated on a multilayered structure or in the case that another film or sheet is laminated on a multilayered structure with adhesive, a thermoplastic resin film or sheet as well as an appropriate substrate such as paper, metal foil, uniaxial or biaxial stretched plastic film or sheet, and a film or sheet with deposit of inorganic compound, woven fabric, non-woven fabric, metal cotton, wooden material and the like may be used.

Such multilayered structure may be subjected to hot-drawing process. A conventionally known hot-drawing process may be employed.

Examples of the hot-drawing processes include: uniaxial or biaxial stretching where a multilayered sheet or film is stretched in width direction with holding both sides thereof; molding process where a multilayered sheet or film is forced against mold such as deep draw forming, vacuum forming, air-pressure forming, and vacuum-pressure forming; forming by tubular stretching or stretch blow molding a pre-formed multilayered sheet such as parison; and so on.

The molding material, which serves a mixture of 2 or more types EVOH resins differing in their ethylene unit content, has excellent stretching processability, and therefore is preferably applicable in post-molding or fabricating.

A hot-drawing temperature is selected from the range of usually 40 to 300° C., preferably 50 to 160° C., in terms of a temperature nearby the multilayered structure, and stretching magnification is selected from the range of usually 2 to 50 times, preferably 2 to 10 times in terms of area ratio.

A stretched multilayer film or sheet may be subjected to heat setting for imparting dimensional stability. Heat setting may be conducted by well-known process, for example, a process of heating with stretching at a temperature of usually 80 to 180° C., preferably 100 to 165° C. usually for 2 to 600 seconds.

When the stretched multilayered film made of a molding material of the invention is used as a shrinkable film, the stretched multilayered film is not subjected to heat setting but cool setting by, for example, cooling the stretched multilayered film with cool air for imparting thermal shrink property.

A container such as bag, cup, tray, tube and bottle or a cover thus obtained by post-molding or fabricating exhibits excellent gas-barrier property based on the low ethylene EVOH resin contained in a molding material as a raw material. Accordingly, besides a container or cover for general food, a container for various packaging for condiment such as mayonnaise and dressing, fermented food such as miso, oil and fat food such as salad oil, beverages, cosmetics, and pharmaceutical preparations.

EXAMPLE

Hereinafter the present invention is described below based on examples, but the invention is not restricted by the examples unless exceeding the gist of the invention.

Incidentally, the unit "part" in the examples is on the basis of weight unless otherwise indicated.

[Preparation of Molding Material Nos. 1 to 9]

(1) Low Ethylene EVOH Resin Pellet

As a low ethylene EVOH resin, used was EVOH resin having ethylene unit content of 29 mol %, saponification degree of 99.6 mol %, and MFR of 3.4 g/10 minutes (210° C., load of 2160 g). The low ethylene EVOH resin was melt-extruded in a form of strand. The obtained strand was cut at 0.4 cm intervals with cutter and dried to produce column-shaped pellets of low ethylene EVOH resin having 3 mm in diameter and 3 mm in length.

Thus produced low ethylene EVOH resin pellets (A1) and lubricant (ethylene his stearic acid amide) were put in a plastic bag and thereafter the bag was sealed. The respective amount of lubricant put in the bag is indicated in Table 1. The plastic bag was vigorously shaken at 24° C. in air atmosphere to mix the pellets with lubricant, thereby obtaining low ethylene EVOH resin pellets of which the lubricant is carried on their surface, which is called "lubricant-carrying low ethylene EVOH resin pellets".

(2) High Ethylene EVOH Resin Pellet

As a high ethylene EVOH resin, used was an EVOH resin having ethylene unit content of 44 mol %, saponification degree of 98.5 mol %, and MFR4.1 g/10 minutes (210° C. load of 2160 g). The high ethylene EVOH resin was melt-extruded in the form of strand. The obtained strand was cut with cutter at 0.4 cm intervals and dried, thereby obtaining a column-shaped pellets of high ethylene EVOH resin each having 3 mm in diameter and 3 mm in length.

Thus produced high ethylene EVOH resin pellets (A2) and lubricant (ethylene bis stearic acid amide) was put in plastic bag and thereafter the bag was sealed. The respective amount of lubricant put in the bag is indicated in Table 1. The plastic bag was vigorously shaken at 24° C. in air atmosphere to mix the pellets with lubricant, thereby obtaining high ethylene EVOH resin pellets of which the lubricant is carried on their surface, which is called "lubricant-carrying high ethylene EVOH resin pellets".

(3) Preparation of Pellet Mixture

Thus produced lubricant-carrying low ethylene EVOH resin pellets (A1) and lubricant-carrying high ethylene EVOH resin pellets (A2) were put in a plastic bag and thereafter the bag was sealed. The respective amounts of these pellets contained in the bag satisfied respective contents indicated in Table 1 The plastic bag was vigorously shaken at 24° C. in air atmosphere to mix the pellets, thereby obtaining a pellet mixture as a molding material No. 1 to 9 respectively.

[Evaluation of Molding Material]

Thus produced pellet mixture as a molding material was formed to film having a thickness of 50 μm. Feed property was evaluated during film production according to the method below. Film moldability of the obtained film was evaluated. The evaluation results are shown in Table 1.

(Conditions of Film Forming)
screw inner diameter: 19 mm
L/D: 25
screw compression ratio: 2
T die: coat hanger type
die width: 150 mm
extrusion temperature (° C.): C1/C2/C3/C4/C5(adapter)/ C6 (die)=140/200/210/210/210/210

In forming the EVOH resin film, feed property and film moldability were evaluated.

(1) Feed Property

The person standing at the position about 50 cm apart from the extruder evaluated on noise emission in the production of EVOH resin film according to the criteria as follows:

"602": seldom heard loud noise
"Δ": heard loud noise but it was not uncomfortable level
"x": heard loud noise.

The lower the noise is, the better the feed property.

(2) Film Moldability

The film width (cm) of the produced 1 m-long EVOH resin film was measured at 10 cm intervals and eleven width values were gained. The difference (unit: cm) between maximum value and minimum value of the eleven values was calculated. The smaller difference indicates the better film moldability with reduced surge.

an amount of 75% or less by weight based on the total lubricant in the molding material.

Molding material Nos. 1 to 6, in which more than 75% by weight of the lubricant was carried on the low ethylene EVOH resin pellets, did not have a problem on teed property and exhibited excellent film moldability. However, as comparison among molding materials Nos. 1, 4, 5 and 6, in the case that the amount of lubricant contained in the molding material was reduced by decreasing the content of low ethylene EVOH resin pellets in the molding material, melt-extruded film tended to vary in width. From these result, it is understood that the content of lubricant-carrying low ethylene EVOH resin pellets is needed to adjust 50% or more, preferably 60% or more by weight based on the total weight of EVOH resin pellets.

Moreover, as comparison among molding materials Nos. 1 to 3, Nos. 2 and 3 were superior to No. 1 in feed property regardless of the same total amount of lubricant contained in the molding material. In the molding material No. 1, all lubricant was carried on low ethylene EVOH resin pellets but no lubricant was carried on high ethylene EVOH resin pellets. Whereas in molding material Nos. 2 and 3, more than 75 wt % of the lubricant carried on low ethylene EVOH resin pellets at the same time slight amount of the lubricant was carried on high ethylene EVOH resin pellets.

INDUSTRIAL APPLICABILITY

In the case of a molding material comprising two or more EVOH resins differing in their ethylene unit content, use of a pellet mixture of plural types of EVOH resin pellets differing in their ethylene unit content can exhibit feed property and film moldability almost equal to the case of using pellets of EVOH resin mixture obtained by homogenously kneading the EVOH resins. The molding material of

TABLE 1

| | Molding material | | | | | | |
|---|---|---|---|---|---|---|---|
| | Low ethylene EVOH pellets (A1) | | High ethylene EVOH pellets (A2) | | Lubricant amount per total | Percentage of Lubricant carried on A1 per total | Evaluation | |
| Molding material No. | content (wt %) | Lubricant amount (ppm) | content (wt %) | Lubricant amount (ppm) | weight of (A1 + A2) (ppm) | weight of lubricant (%) | Feed property | Film moldability (cm) |
| 1 | 75 | 200 | 25 | 0 | 150 | 100 | Δ | 0.4 |
| 2 | 75 | 190 | 25 | 30 | 150 | 95 | ○ | 0.4 |
| 3 | 75 | 170 | 25 | 90 | 150 | 85 | ○ | 0.3 |
| 4 | 85 | 200 | 15 | 0 | 170 | 100 | Δ | 0.2 |
| 5 | 65 | 200 | 35 | 0 | 130 | 100 | Δ | 0.4 |
| 6 | 50 | 200 | 50 | 0 | 100 | 100 | Δ | 0.7 |
| 7 | 75 | 150 | 25 | 150 | 150 | 75 | ○ | 1.2 |
| 8 | 75 | 0 | 25 | 600 | 150 | 0 | ○ | 1.7 |
| 9 | 75 | 0 | 25 | 0 | 0 | 0 | X | 0.2 |

The molding material (No. 9), which contained no lubricant, did not satisfy feed property. The molding material Nos. 1 to 3, 7, and 8 contained the same amount of lubricant from one another, however, the molding material Nos. 7 and 8 exhibited inferior film moldability because the extruded films varied in film width and showed large surge. The molding material No. 8 comprised low ethylene EVOH resin pellets which did not have lubricant carried on the surface. The molding material No. 7 comprised low ethylene EVOH resin pellets which had lubricant carried on their surface in the invention makes it possible to prepare wide range of molding materials and reduce production cost in preparation of a molding material comprising a plurality of EVOH resins.

What is claimed is:

1. A melt-molding material comprising a lubricant and a mixture of first (A1) and second (A2) saponified ethylene-vinyl ester copolymer pellets, the first and second pellets differing in their ethylene unit content, wherein the first saponified ethylene-vinyl ester copolymer pellets (A1) have an ethylene unit content of from 20 mol % to 30 mol % and the second saponified ethylene-vinyl ester copolymer pellets (A2) have an ethylene unit content of from more than 30 mol % to 60 mol %, wherein the first saponified ethylene-vinyl ester copolymer pellets (A1) are from 50 wt % to 90 wt % based on the total weight of saponified ethylene-vinyl ester copolymer pellets, and wherein the first saponified ethylene-vinyl ester copolymer pellets (A1) contain from 76% to 99% by weight of the lubricant, the lubricant being carried on at least the surface of the saponified ethylene-vinyl ester copolymer pellets (A1);

wherein the difference in the amount of lubricant per pellet between the first (A1) and the second (A2) saponified ethylene-vinyl ester copolymer pellets is in the range of 80 ppm to 160 ppm.

2. The melt-molding material according to claim 1, wherein the total weight of the lubricant is from 100 ppm to 250 ppm based on the total weight of saponified ethylene-vinyl ester copolymers.

3. The melt-molding material according to claim 1, wherein a difference in ethylene unit content between the first saponified ethylene-vinyl ester copolymer pellets (A1) and the second saponified ethylene-vinyl ester copolymer pellets (A2) is 5 mol % or more.

4. A melt-molding material comprising a lubricant and a mixture of first (A1) and second (A2) saponified ethylene-vinyl ester copolymer pellets, the first and second pellets differing in their ethylene unit content, wherein the first saponified ethylene-vinyl ester copolymer pellets (A1) have an ethylene unit content of from 20 mol % to 30 mol % and the second saponified ethylene-vinyl ester copolymer pellets (A2) have an ethylene unit content of from more than 30 mol % to 60 mol %, wherein the first saponified ethylene-vinyl ester copolymer pellets (A1) contain from 76% to 97% by weight of the lubricant, the lubricant being carried on at least the surface of saponified ethylene-vinyl ester copolymer pellets (A1), wherein the first saponified ethylene-vinyl ester copolymer pellets (A1) is in the range of 50 wt % to 90 wt % based on the total weight of the saponified ethylene-vinyl ester copolymer pellets, wherein the second saponified ethylene-vinyl ester copolymer pellets (A2) have an ethylene unit content 5 mol % or more higher than the ethylene unit content of the first saponified ethylene-vinyl ester copolymer pellets (A1), and have a lubricant carried on at least the surface of the second saponified ethylene-vinyl ester copolymer pellets (A2), wherein the total weight of the lubricant is from 100 ppm to 200 ppm based on the total weight of saponified ethylene-vinyl ester copolymers, and wherein the difference in the amount of lubricant per pellet between the first (A1) and the second (A2) saponified ethylene-vinyl ester copolymer pellets is in the range of 80 ppm to 160 ppm.

5. The melt-molding material according to claim 1, wherein the total weight of the lubricant is from 100 ppm to 200 ppm based on the total weight of saponified ethylene-vinyl ester copolymers.

6. The melt-molding material according to claim 4, wherein the lubricant is higher fatty acid metal salt or higher fatty acid amide, and wherein both of the first (A1) and the second (A2) saponified ethylene-vinyl ester copolymer pellets have a saponification degree of 90 mol % or more.

7. A method for manufacturing a melt-molding material comprising a lubricant and a mixture of first (A1) and second (A2) saponified ethylene-vinyl ester copolymer pellets, the first and second pellets differing in their ethylene unit content, wherein the first saponified ethylene-vinyl ester copolymer pellets (A1) have an ethylene unit content of from 20 mol % to 30 mol % and the second saponified ethylene-vinyl ester copolymer pellets (A2) have an ethylene unit content of more than 30 mol % to 60 mol %, wherein the first saponified ethylene-vinyl ester copolymer pellets (A1) are from 50 wt % to 90 wt % based on the total weight of saponified ethylene-vinyl ester copolymer pellets, and wherein the first saponified ethylene-vinyl ester copolymer pellets (A1) contain from 76% to 99% by weight of the lubricant, the lubricant being carried on at least the surface of the saponified ethylene-vinyl ester copolymer pellets (A1), and wherein the difference in the amount of lubricant per pellet between the first (A1) and the second (A2) saponified ethylene-vinyl ester copolymer pellets is in the range of 80 ppm to 160 ppm;

the method comprising:

dry-blending from 76% to 99% by weight of the lubricant with the first saponified ethylene-vinyl ester copolymer pellets (A1) wherein the lubricant is carried on at least the surface of the pellets.

8. The method for manufacturing a melt-molding material according to claim 7, further comprising dry-blending the second saponified ethylene-vinyl ester copolymer pellets (A2) with the first pellets (A1).

* * * * *